(12) United States Patent
Chmiel et al.

(10) Patent No.: US 10,749,657 B2
(45) Date of Patent: Aug. 18, 2020

(54) MAPPING REFERENCE SIGNAL FOR MULTI-CELL TRANSMISSION

(75) Inventors: Mieszko Chmiel, Wroclaw (PL); Xiang Guang Che, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 751 days.

(21) Appl. No.: 13/518,035

(22) PCT Filed: Dec. 25, 2009

(86) PCT No.: PCT/CN2009/076048
§ 371 (c)(1),
(2), (4) Date: Sep. 10, 2012

(87) PCT Pub. No.: WO2011/075908
PCT Pub. Date: Jun. 30, 2011

(65) Prior Publication Data
US 2012/0329468 A1 Dec. 27, 2012

(51) Int. Cl.
*H04L 5/00* (2006.01)
(52) U.S. Cl.
CPC ............ *H04L 5/0073* (2013.01); *H04L 5/005* (2013.01); *H04L 5/0007* (2013.01); *H04L 5/0035* (2013.01); *H04L 5/0051* (2013.01)
(58) Field of Classification Search
CPC ..... H04L 5/0073; H04L 5/005; H04L 5/0035; H04L 5/0007
USPC ......... 455/450, 451, 452.1, 452.2, 453, 454, 455/464, 509, 524, 112, 168.1, 56.1
See application file for complete search history.

(56) References Cited

U.S. PATENT DOCUMENTS

| | | | | |
|---|---|---|---|---|
| 4,550,222 A | * | 10/1985 | Hanni et al. | .................. 380/269 |
| 8,811,252 B2 | * | 8/2014 | Maeda et al. | .................. 370/312 |
| 9,077,503 B2 | * | 7/2015 | Ng | .......... H04L 1/0026 |
| 2008/0273510 A1 | * | 11/2008 | Mudulodu | ............. H04B 7/068 |
| | | | | 370/339 |
| 2010/0272004 A1 | * | 10/2010 | Maeda et al. | .................. 370/312 |
| 2011/0199986 A1 | * | 8/2011 | Fong et al. | .................. 370/329 |
| 2011/0235601 A1 | * | 9/2011 | Yoo et al. | ..................... 370/329 |

(Continued)

FOREIGN PATENT DOCUMENTS

| | | |
|---|---|---|
| CN | 101267664 A | 9/2008 |
| CN | 101500242 A | 8/2009 |

(Continued)

OTHER PUBLICATIONS

RP-090359, TSG-RAN Meeting #43, Biarritz, France, Mar. 3-6, 2009, "Work Item Description for Enhanced DL transmission for LTE", CMCC, 5 pgs.

(Continued)

*Primary Examiner* — Shahriar Behnamian
(74) *Attorney, Agent, or Firm* — Harrington & Smith

(57) ABSTRACT

Described is a method for the mapping of reference signals. The method includes generating a reference signal sequence for two or more cells, where each cell of the two or more cells has a cell bandwidth. The method also includes determining an offset for the reference signal sequence based at least in part on the cell bandwidth of each cell. Mapping the reference signal sequence to resource elements of physical resource blocks for the cells based at least in part on the offset is included in the method. Apparatus and computer readable media are also disclosed.

24 Claims, 8 Drawing Sheets

$a_{n+3(offset)} = a_{n+3}$
$a_{n+4}$
$a_{n+5}$
$a_{n+3(offset)+k} = a_{n+k+3}$
$a_{n+k+4}$
$a_{n+k+5}$ $a_{n+3(offset)+2k} = a_{n+3+2k}$
$a_{n+2k+4}$
$a_{n+2k+5}$
$a_{n+3(offset)+3k} = a_{n+3+3k}$
$a_{n+3k+4}$
$a_{n+3k+5}$

(56) References Cited

U.S. PATENT DOCUMENTS

| | | | | |
|---|---|---|---|---|
| 2011/0244877 | A1* | 10/2011 | Farajidana | H04L 5/0023 455/452.2 |
| 2012/0021753 | A1* | 1/2012 | Damnjanovic et al. | 455/450 |
| 2012/0087442 | A1* | 4/2012 | Xu | H04L 5/0051 375/299 |
| 2012/0127954 | A1* | 5/2012 | Lim et al. | 370/330 |
| 2014/0254516 | A1* | 9/2014 | Lee et al. | 370/329 |
| 2014/0329553 | A1* | 11/2014 | Nakashima et al. | 455/522 |

FOREIGN PATENT DOCUMENTS

| EP | 2120354 A1 | 11/2009 |
|---|---|---|
| WO | WO 2008/093716 A1 | 8/2008 |
| WO | WO 2008/094022 A1 | 8/2008 |
| WO | WO 2009078152 A1 * | 6/2009 |

OTHER PUBLICATIONS

R1-093697, 3GPP TSG RAN WG1 Meeting #58, CHN, Shenzhen, Aug. 24-28, 2009, "Proposed Way forward on Rel-9 Dual-layer beamforming for TDD and FDD", Alcatel-Lucent, et al., 3 pgs.

R1-093890, 3GPP TSG RAN WG1 #58bis Meeting, Miyazaki, Japan, Oct. 12-16, 2009, "Considerations on Initialization and Mapping of DM-RS Sequence", Nokia Siemens Networks, Nokia, 5 pgs.

R1-095131, 3GPP TSG-RAN WG1 Meeting #59, Jeju, South Korea, Nov. 9-13, 2009, "CR36.211 Introduction of enhanced dual layer transmission", 8 pgs.

3GPP TR 36.814, V0.4.1 (Feb. 2009), "$3^{rd}$ Generation Partnership Project; Technical Specification Group Radio Access network; Further Advancements for E-UTRA Physical Layer Aspects (Release 9)", 31 pgs.

3GPP TS 36.300, V9.1.0 (Sep. 2009), "$3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9)", 165 pgs.

3GPP TS 36.211, V8.8.0 (Sep. 2009), "$3^{rd}$ Generation Partnership Project; Technical Specification Group Radio Access Network; Evolved Universal Terrestrial Radio Access (E-UTRA); Physical channels and Modulation (Release 8)", 83 pgs.

3GPP TS 36.211 V8.9.0 (Dec. 2009), "$3^{rd}$ Generation Partnership Project; Technical Specification Group Radio Access Network; Evolved Universal Terrestrial Radio Access (E-UTRA); Physical channels and Modulation ((Release 8)", 83 pgs.

Panasonic: "DL DM-RS with inter-cell considerations" 3GPP; R1-091747, $3^{rd}$ Generation Partnership Project (3GPP), Mobile Competence Centre; 650, Route Des Lucioles; F-06921 Sophia-Antipolis Cedex; France, No. San Francisco, USA; Apr. 28, 2009, Apr. 28, 2009, XP050339273.

* cited by examiner $a_n$ n-th symbol of the scrambling sequence
(a bit pair of the scrambling sequence due QPSK scrambling)

$k$ number of URS REs in a DRS-bearing OFDM symbol
assuming max. system BW

▨  URS RE

----▶ Order of URS sequence mapping

MAPPING REFERENCE SIGNAL FOR MULTI-CELL TRANSMISSION

TECHNICAL FIELD

The exemplary and non-limiting embodiments of this invention relate generally to wireless communication systems, methods, devices and computer programs and, more specifically, relate to mapping of reference signals for multi-cell transmission.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

3GPP third generation partnership project
BW bandwidth
CDM code division multiplexing
C-MIMO cooperative MIMO
CoMP coordinated multi-point transmission/reception
CRS common reference signal
CSI channel state information
DCI downlink control information
DL downlink (eNB towards UE)
DM-RS demodulation RS
DRS dedicated reference signal
eNB E-UTRAN Node B (evolved Node B)
EPC evolved packet core
E-UTRA evolved UTRA
E-UTRAN evolved UTRAN (LTE)
HARQ hybrid automatic repeat request
ID identity
JP joint transmission/processing
LTE long term evolution of UTRAN (E-UTRAN)
LTE-A long term evolution advanced
MAC medium access control (layer 2, L2)
MIMO multiple input multiple output
MM/MME mobility management/mobility management entity
MU multi user
MU-MIMO multi user MIMO
Node B base station
O&M operations and maintenance
OFDM orthogonal frequency division multiplexing
OFDMA orthogonal frequency division multiple access
PCI physical cell ID
PDCP packet data convergence protocol
PHY physical (layer 1, L1)
PRB physical resource block
QPSK quadrature phase shift keying
RE resource element
Rel release
RLC radio link control
RRC radio resource control
RRM radio resource management
RS reference signal
SC-FDMA single carrier, frequency division multiple access
SDM space division multiplexing
S-GW serving gateway
SI system information
SU single user
SU-MIM0 single user MIMO
TP transmission point
TPMI transmitted precoding matrix indicator
TTI transmission time interval
UE user equipment, such as a mobile station or mobile terminal
UL uplink (UE towards eNB)
UMTS universal mobile telecommunications system
URS UE-specific reference signal
UTRA UMTS terrestrial radio access
UTRAN universal terrestrial radio access network
WID work item description A communication system known as evolved UTRAN (E-UTRAN, also referred to as UTRAN-LTE or as E-UTRA) has been specified within 3GPP. The DL access technique is OFDMA, and the UL access technique is SC-FDMA.

One specification of interest is 3GPP TS 36.300, V9.1.0 (2009-Sep.), "3rd Generation Partnership Project; Technical Specification Group Radio Access Network; Evolved Universal Terrestrial Radio Access (E-UTRA) and Evolved Universal Terrestrial Access Network (E-UTRAN); Overall description; Stage 2 (Release 9)", incorporated by reference herein in its entirety.

FIG. 1 reproduces FIG. 4.1 of 3GPP TS 36.300, and shows the overall architecture of the E-UTRAN system. The E-UTRAN system includes eNBs, providing the E-UTRA user plane (PDCP/RLC/MAC/PHY) and control plane (RRC) protocol terminations towards the UE (not shown). The eNBs are interconnected with each other by means of an X2 interface. The eNBs are also connected by means of an S1 interface to an EPC, more specifically to a MME (Mobility Management Entity) by means of a S1 MME interface and to a Serving Gateway (SGW) by means of a S1 interface. The S1 interface supports a many-to-many relationship between MMEs/S-GW and eNBs.

The eNB hosts the following functions:
  functions for RRM: Radio Bearer Control, Radio Admission Control, Connection Mobility Control, Dynamic allocation of resources to UEs in both UL and DL (scheduling);
  IP header compression and encryption of the user data stream;
  selection of a MME at UE attachment;
  routing of User Plane data towards the Serving Gateway;
  scheduling and transmission of paging messages (originated from the MME);
  scheduling and transmission of broadcast information (originated from the MME or O&M); and
  a measurement and measurement reporting configuration for mobility and scheduling.

UE-specific reference signals (URS) (also known as dedicated reference signal (DRS) or demodulation RS (DM-RS) within the context of LTE-A) were agreed to be used as the demodulation reference signal in the downlink of Rel-10 and Rel-9. These reference signals are present in the transmitted physical resource blocks (PRBs) and the transmitted spatial layers. They undergo the same precoding operations as the corresponding data channel. Benefits of URSs include non-constrained precoding, no need for transmit precoding matrix index (TPMI) signaling in the downlink and reduced overhead compared to non-preceded common reference signals (CRS). See further, 3GPP TR 36.814, v0.4.1, "Further Advancements for E-UTRA Physical Layer Aspects", February 2009 (attached as Exhibit A and incorporated by referenced in its entirety) and 3GPP WID RP-090359, "Enhanced DL transmission for LTE", March 2009 (attached as Exhibit B and incorporated by referenced in its entirety).

Coordinated multi-point transmission/reception (CoMP) is considered a promising technique in LTE-A to achieve high cell-edge and cell average throughput gains. DRS mapping and initialization is to be used in LTE Rel-9 (dual layer beamforming) and in LTE-A (higher order DL SU-MIMO, MU-MIMO and CoMP) as well as in LTE-A Rel-10. See further, 3GPP TR 36.814 (Exhibit A); 3GPP R1-093890, "Considerations on Initialization and Mapping of DM-RS Sequence", Nokia Siemens Networks, Nokia, October 2009 (attached as Exhibit C and incorporated by referenced in its entirety); 3GPP CR 0141R1, R1-095131, "CR 36.211 Introduction of enhanced dual layer transmission", November 2009 (attached as Exhibit D and incorporated by referenced in its entirety) and 3GPP R1-093697, "Proposed Way forward on Rel-9 Dual-layer beamforming for TDD and FDD" August 2009 (attached as Exhibit E and incorporated by referenced in its entirety).

FIG. 2 illustrates an exemplary LTE-A Rel-9/10 URS scrambling sequence generation and mapping (for rank 1-2). The initialization and mapping of the URS scrambling sequences in LTE Rel-9/10 have the following properties: a re-initialization period of 1 subframe (1 ms) (sequence periodicity: one radio frame, 10 ms); a sequence for example, QPSK Gold initialized with Scrambling ID, Cell ID and subframe number; and a mapping, for example, the generated sequence assumes the maximum system BW in a subframe and maps to URS resource elements (REs) frequency-first (time-later) for the assumed system BW. The actual URS sequence may correspond to the used/allocated PRBs (pilots of multiple layers or SD multiplexed users can be separated by the use of an orthogonal code on top of the scrambling sequence). See further R1-093890 (Exhibit C) and R1-095131 (Exhibit D).

As shown, each RE in the resource grid represents a time-domain segment and frequency domain segment. As shown, one PRB encompasses twelve frequency domain segments of the system bandwidth and fourteen (or twelve for the extended cyclic prefix) time domain segments of the subframe (168 total REs or 144 total REs for the extended cyclic prefix). The PRB may be considered a PRB pair where the first seven (or six for the extended cyclic prefix) time domain segments represent even-numbered slots and the second seven (or six for the extended cyclic prefix) time domain segments represent odd-numbered slots.

The sequence of URS mapping progresses along the frequency domain for a first time domain segment then after reaching the maximum system bandwidth restarts in a first frequency domain segment at the next appropriate time domain segment.

FIG. 3 illustrates exemplary URS sequences for different BWs (the DC subcarrier is ignored for simplicity). In other relative frequency positions of transmission points with different bandwidths MU joint transmission/processing CoMP (JP CoMP) is not possible. As shown in FIG. 3, a given PRB pair (PRB with a given number/index) will use the same parts of the scrambling sequence regardless of the actual cell BW. This operation is sufficient for the case when 1) cooperating cells have the same BW and their center frequencies (e.g., DC subcarriers) are aligned or 2) cooperating cells have different BWs and their first PRBs (the lowest frequency PRBs) are frequency aligned. In other cases (e.g. when the BWs of cooperating cells are different and are center aligned), MU JP CoMP based on code division multiplexed (CDMed) DRS may not be possible due to scrambling sequences on overlapping PRBs of cooperating cells not being in-sync (e.g., not the same).

The problem of reference signal sequence variance due to different cell BWs was noticed for CRS in Rel-8. The Rel-8 CRS solution was to use the sequence re-initialization period of one OFDM symbol, generate the sequence for the max system BW and use the central part of the sequence in a given BW. Therefore, the CRS sequence in the central PRBs would not depend on the system BW.

Although the DRS sequence can also be centered so that its central elements are invariant to the system BW, the disadvantage of this solution is that JP CoMP with transmission points of different BWs would be only possible in case the center frequencies of transmission points are aligned.

See further 3GPP TS 36.211, v8.8.0, "Evolved Universal Terrestrial Radio Access (E-UTRA); Physical channels and modulation", September 2009 (attached as Exhibit F and incorporated by referenced in its entirety) regarding the details of the Rel-8 CRS solution.

What is needed is a technique to sequence reference signals which can accommodate different cell BWs and does not require a specific frequency alignment.

SUMMARY

The below summary section is intended to be merely exemplary and non-limiting.

The foregoing and other problems are overcome, and other advantages are realized, by the use of the exemplary embodiments of this invention.

In a first aspect thereof an exemplary embodiment of this invention provides a method for mapping of RSs. The method includes generating a RS sequence for two or more cells, where each cell of the two or more cells has a cell BW. The method also includes determining an offset for the RS sequence based at least in part on the cell BW of each cell. Mapping the RS sequence to REs of PRBs for the cells based at least in part on the offset is included in the method.

In another aspect thereof an exemplary embodiment of this invention provides an apparatus for mapping of RSs. The apparatus includes at least one processor; and at least one memory including computer program code. The at least one memory and the computer program code are configured to, with the at least one processor, cause the apparatus to perform operations. The operations include to generate a RS sequence for two or more cells, where each cell of the two or more cells has a cell BW. The operations also include to determine an offset for the RS sequence based at least in part on the cell BW of each cell. To mapping the RS sequence to REs of PRBs for the cells based at least in part on the offset is included in the operations.

In a further aspect thereof an exemplary embodiment of this invention provides a computer readable medium tangibly encoded with a computer program executable by a processor to perform actions for mapping of RSs. The actions include generating a RS sequence for two or more cells, where each cell of the two or more cells has a cell BW. The actions also include determining an offset for the RS sequence based at least in part on the cell BW of each cell. Mapping the RS sequence to REs of PRBs for the cells based at least in part on the offset is included in the actions.

In another aspect thereof an exemplary embodiment of this invention provides an apparatus for mapping of RSs.

The apparatus includes means for generating a RS sequence for two or more cells, where each cell of the two or more cells has a cell BW. The apparatus also includes means for determining an offset for the RS sequence based at least in part on the cell BW of each cell. Means for mapping the RS sequence to REs of PRBs for the cells based at least in part on the offset is included in the apparatus.

BRIEF DESCRIPTION OF THE DRAWINGS

The foregoing and other aspects of exemplary embodiments of this invention are made more evident in the following Detailed Description, when read in conjunction with the attached Drawing Figures, wherein.

DETAILED DESCRIPTION

Various exemplary embodiments in accordance with this invention relate to an LTE-Advanced Study Item (or a Work Item) in Rel-10/11: more specifically, downlink UE-specific reference signal design in support of cooperative multi-cell transmission/reception (CoMP or C-MIMO) and related scrambling sequence mapping. Reference signals in support of the Joint Transmission/Processing flavor of CoMP (JP CoMP) may be used in situations where the transmission points (e.g. participating cells) have unequal bandwidths.

Figure 4:
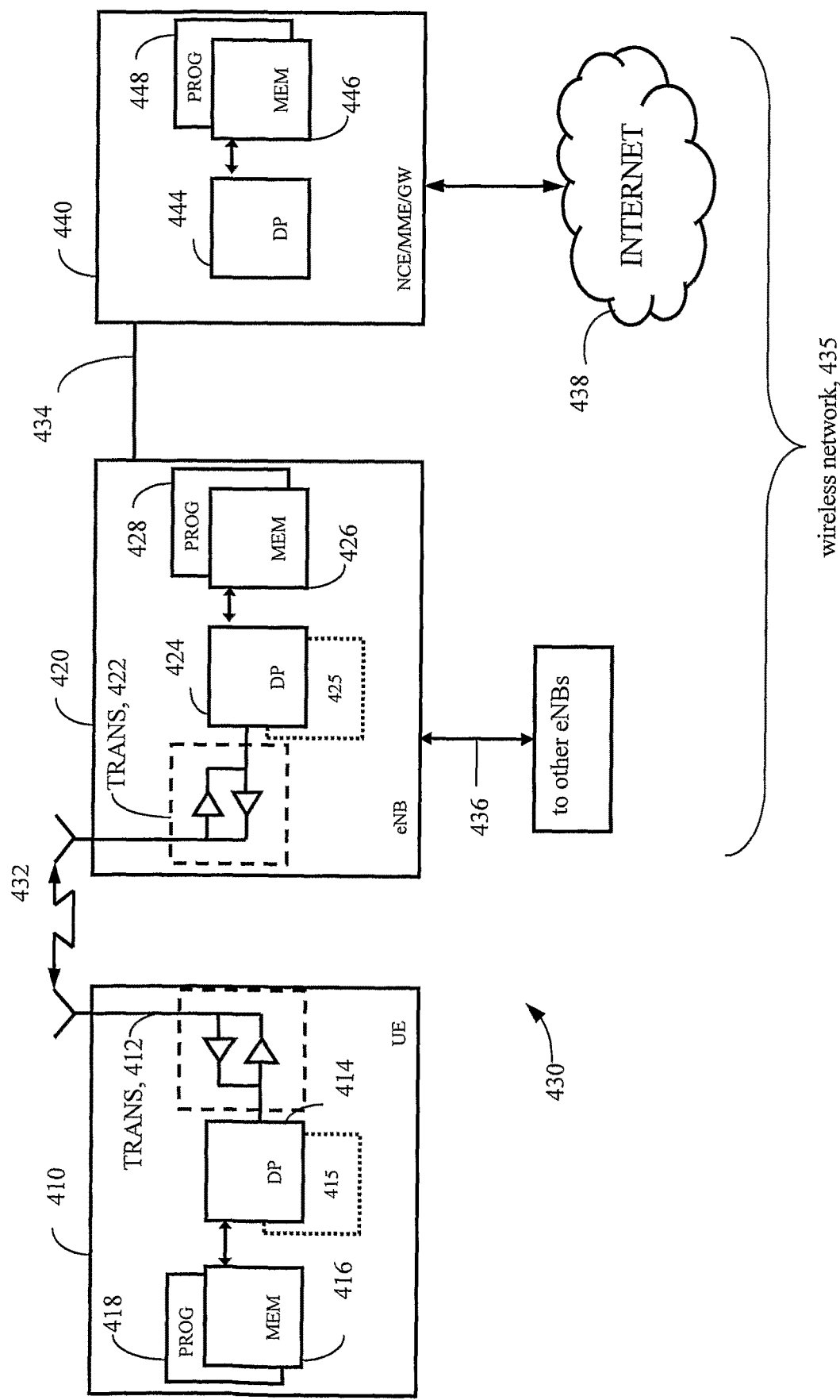
FIG. 4 shows a simplified block diagram of exemplary electronic devices that are suitable for use in practicing various exemplary embodiments of this invention.

Before describing in further detail various exemplary embodiments of this invention, reference is made to FIG. 4 for illustrating a simplified block diagram of various electronic devices and apparatus that are suitable for use in practicing exemplary embodiments of this invention.

Figure 1:
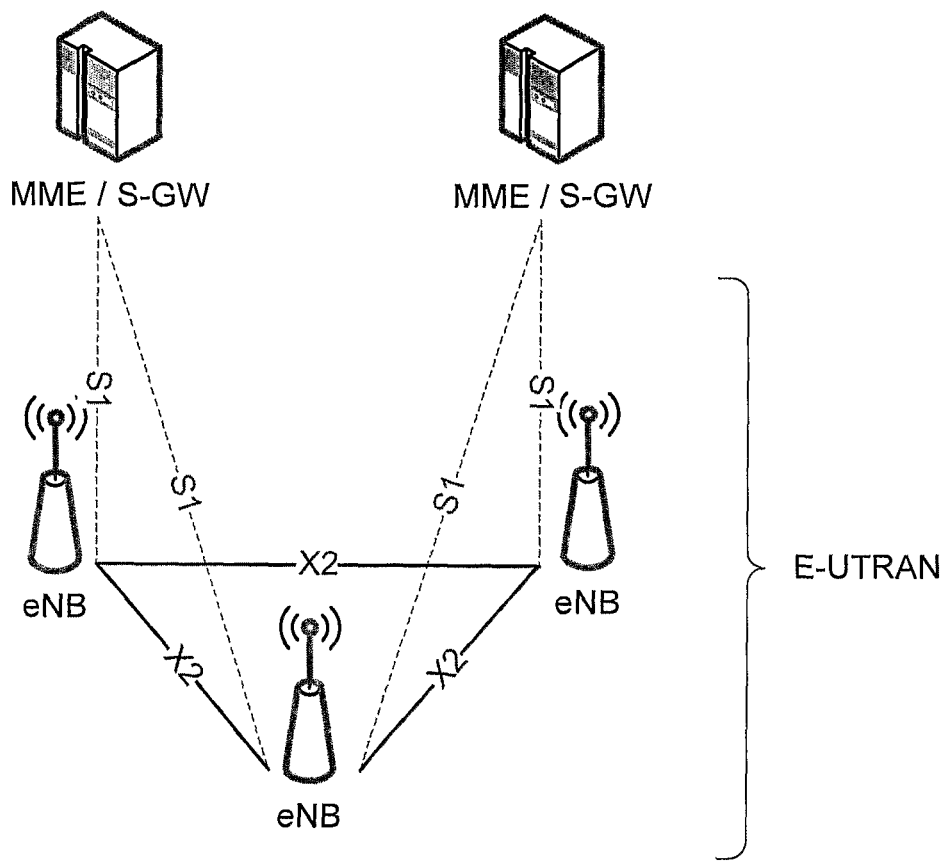
FIG. 1 reproduces FIG. 4 of 3GPP TS 36.300, and shows the overall architecture of the E UTRAN system.
Figure 2A:
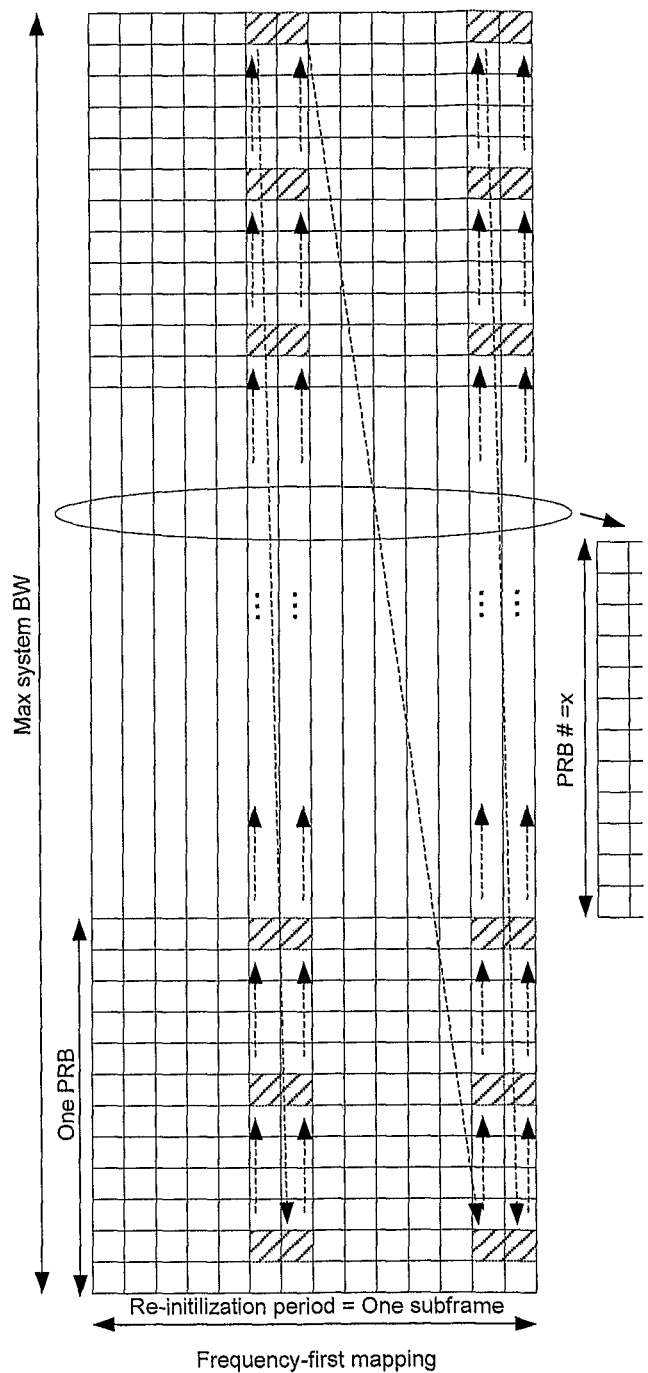
FIG. 2 illustrates an exemplary LTE-A Rel-9/10 URS scrambling sequence generation and mapping.
Figure 2B:
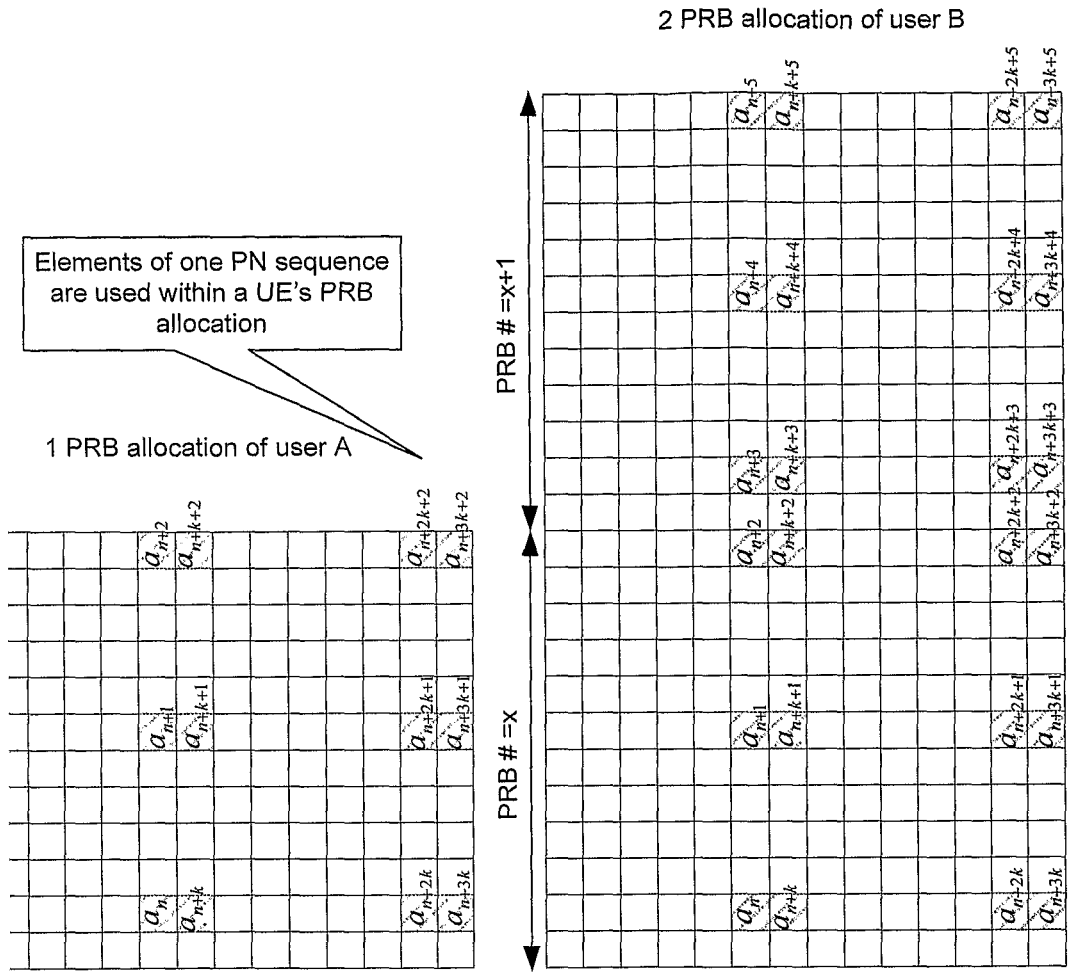
Figure 3:
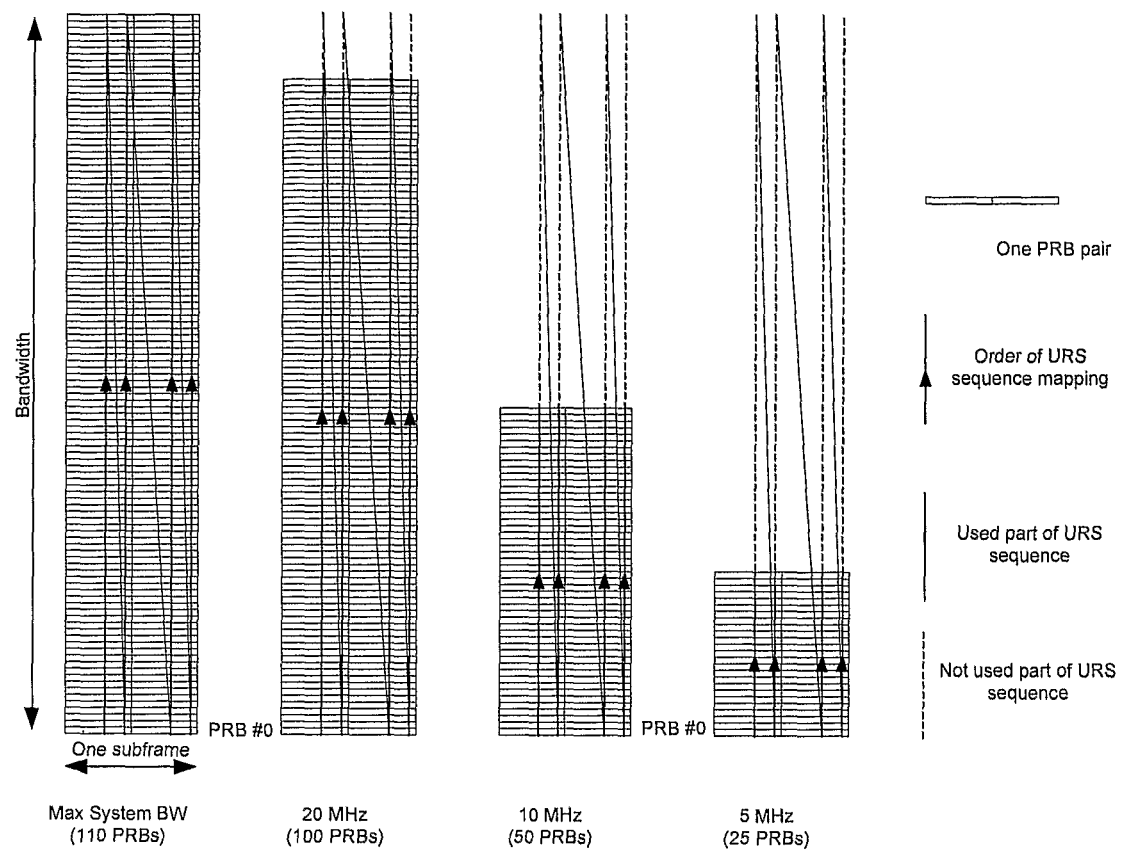
FIG. 3 illustrates an exemplary URS sequences for different bandwidths (BWs).

In the wireless system 430 of FIG. 4, a wireless network 435 is adapted for communication over a wireless link 432 with an apparatus, such as a mobile communication device which may be referred to as a UE 410, via a network access node, such as a Node B (base station), and more specifically an eNB 420. The network 435 may include a network control element (NCE) 440 that may include the MME/SGW functionality shown in FIG. 1, and which provides connectivity with a network, such as a telephone network and/or a data communications network (e.g., the internet 438).

The UE 410 includes a controller, such as a computer or a data processor (DP) 414, a computer-readable memory medium embodied as a memory (MEM) 416 that stores a program of computer instructions (PROG) 418, and a suitable wireless interface, such as radio frequency (RF) transceiver 412, for bidirectional wireless communications with the eNB 420 via one or more antennas.

The eNB 420 also includes a controller, such as a computer or a data processor (DP) 424, a computer-readable memory medium embodied as a memory (MEM) 426 that stores a program of computer instructions (PROG) 428, and a suitable wireless interface, such as RF transceiver 422, for communication with the UE 410 via one or more antennas. The eNB 420 is coupled via a data/control path 434 to the NCE 440. The path 434 may be implemented as the S1 interface shown in FIG. 1. The eNB 420 may also be coupled to another eNB via data/control path 436, which may be implemented as the X2 interface shown in FIG. 1.

The NCE 440 includes a controller, such as a computer or a data processor (DP) 444, a computer-readable memory medium embodied as a memory (MEM) 446 that stores a program of computer instructions (PROG) 448.

At least one of the PROGs 418, 428 and 448 is assumed to include program instructions that, when executed by the associated DP, enable the device to operate in accordance with exemplary embodiments of this invention, as will be discussed below in greater detail.

That is, various exemplary embodiments of this invention may be implemented at least in part by computer software executable by the DP 414 of the UE 410; by the DP 424 of the eNB 420; and/or by the DP 444 of the NCE 440, or by hardware, or by a combination of software and hardware (and firmware).

The UE 410 and the eNB 420 may also include dedicated processors, for example resource scheduler 415 and resource scheduler 425.

In general, the various embodiments of the UE 410 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 416, 426 and 446 may be of any type suitable to the local technical environment and may be implemented using any suitable data storage technology, such as semiconductor based memory devices, flash memory, magnetic memory devices and systems, optical memory devices and systems, fixed memory and removable memory. The DPs 414, 424 and 444 may be of any type suitable to the local technical environment, and may include one or more of general purpose computers, special purpose computers, microprocessors, digital signal processors (DSPs) and processors based on a multicore processor architecture, as non-limiting examples. The wireless interfaces (e.g., RF transceivers 412 and 422) may be of any type suitable to the local technical environment and may be implemented using any suitable communication technology such as individual transmitters, receivers, transceivers or a combination of such components.

Figure 5:
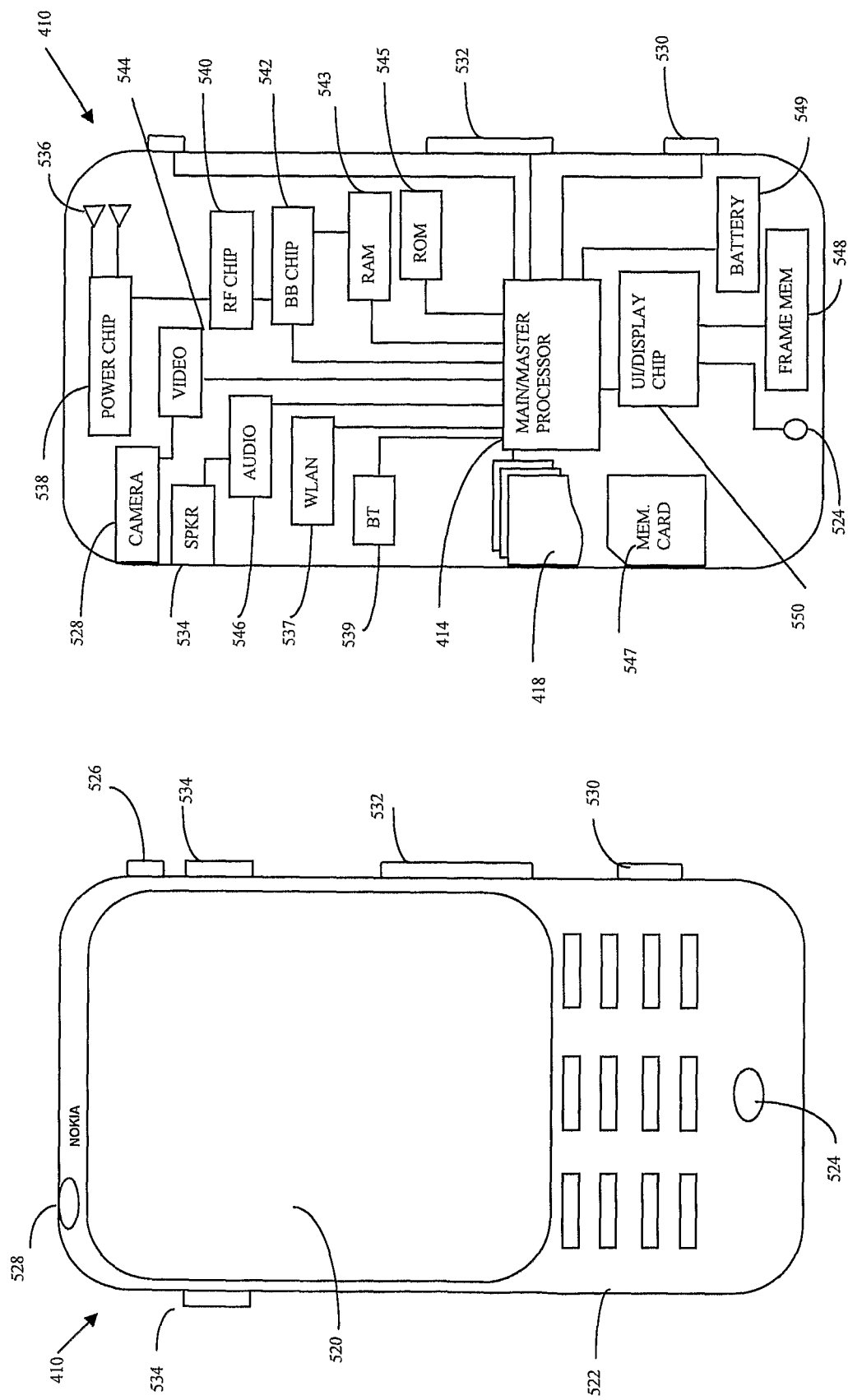
FIG. 5 shows a more particularized block diagram of an exemplary user equipment such as that shown at FIG. 4.

FIG. 5 illustrates further detail of an exemplary UE in both plan view (left) and sectional view (right), and the invention may be embodied in one or some combination of those more function-specific components. At FIG. 5 the UE 410 has a graphical display interface 520 and a user interface 522 illustrated as a keypad but understood as also encompassing touch-screen technology at the graphical display interface 520 and voice-recognition technology received at the microphone 524. A power actuator 526 controls the device being turned on and off by the user. The exemplary UE 410 may have a camera 528 which is shown as being forward facing (e.g., for video calls) but may alternatively or additionally be rearward facing (e.g., for capturing images and video for local storage). The camera 528 is controlled by a shutter actuator 530 and optionally by a zoom actuator 532 which may alternatively function as a volume adjustment for the speaker(s) 534 when the camera 528 is not in an active mode.

Within the sectional view of FIG. 5 are seen multiple transmit/receive antennas 536 that are typically used for cellular communication. The antennas 536 may be multi-band for use with other radios in the UE. The operable ground plane for the antennas 536 is shown by shading as spanning the entire space enclosed by the UE housing though in some embodiments the ground plane may be limited to a smaller area, such as disposed on a printed wiring board on which the power chip 538 is formed. The power chip 538 controls power amplification on the channels being transmitted and/or across the antennas that transmit simultaneously where spatial diversity is used, and amplifies the received signals. The power chip 538 outputs the amplified received signal to the radio-frequency (RF) chip 540 which demodulates and downconverts the signal for baseband processing. The baseband (BB) chip 542 detects the signal which is then converted to a bit-stream and finally decoded. Similar processing occurs in reverse for signals generated in the apparatus 410 and transmitted from it.

Signals to and from the camera 528 pass through an image/video processor 544 which encodes and decodes the various image frames. A separate audio processor 546 may also be present controlling signals to and from the speakers 534 and the microphone 524. The graphical display interface 520 is refreshed from a frame memory 548 as controlled by a user interface chip 550 which may process signals to and from the display interface 520 and/or additionally process user inputs from the keypad 522 and elsewhere.

Certain embodiments of the UE 410 may also include one or more secondary radios such as a wireless local area network radio WLAN 537 and a Bluetooth® radio 539, which may incorporate an antenna on-chip or be coupled to an off-chip antenna. Throughout the apparatus are various memories such as random access memory RAM 543, read only memory ROM 545, and in some embodiments removable memory such as the illustrated memory card 547. The various programs 418 are stored in one or more of these memories. All of these components within the UE 410 are normally powered by a portable power supply such as a battery 549.

Processors 538, 540, 542, 544, 546, 550, if embodied as separate entities in a UE 410 or eNB 420, may operate in a slave relationship to the main processor 414, 424, which may then be in a master relationship to them. Embodiments of this invention are most relevant to the power chip 538, though it is noted that other embodiments need not be disposed there but may be disposed across various chips and memories as shown or disposed within another processor that combines some of the functions described above for FIG. 5. Any or all of these various processors of FIG. 5 access one or more of the various memories, which may be on-chip with the processor or separate therefrom. Similar function-specific components that are directed toward communications over a network broader than a piconet (e.g., components 536, 538, 540, 542-545 and 547) may also be disposed in exemplary embodiments of the access node 420, which may have an array of tower-mounted antennas rather than the two shown at FIG. 5.

Note that the various chips (e.g., 538, 540, 542, etc.) that were described above may be combined into a fewer number than described and, in a most compact case, may all be embodied physically within a single chip.

Various exemplary embodiments in accordance with this invention introduce an offset to shift the mapped reference signal sequence such that the reference signal scrambling sequence from multiple transmission points can be the same in PRBs with different numbers (e.g. in PRBs with different indices). The offset may be configurable.

The offset may be signaled by dedicated RRC signaling, by SI signaling or by DCI signaling. Alternatively, the offset may be derived from other signaled parameters (e.g. the configuration of the CoMP measurement set/transmission points such as BW, center frequency, etc.).

The offset may be defined to have a granularity of one PRB and take positive values (although negative offset values are not excluded) within the range from 0 to $N_{RB}^{max,DL} - N_{RB}^{min,DL}$ or to $N_{RB}^{DL} - N_{RB}^{min,DL}$. For example, offset values $$\left\{0, \frac{1}{2}(N_{RB2}^{DL} - N_{RB1}^{DL}), N_{RB2}^{DL} - N_{RB1}^{DL}\right\}$$

corresponding to lower frequency edge aligned cells, frequency center aligned cells and upper frequency edge aligned cells, respectively, may be used.

$N_{RB}^{max,DL}$ represents the largest downlink bandwidth configuration, $N_{RB}^{min,DL}$ represents the smallest downlink bandwidth configuration and $N_{RB}^{DL}$ represents the downlink bandwidth configuration. These values may be expressed in multiples of $N_{sc}^{RB}$ which represents the resource block size in the frequency domain in numbers of subcarriers. See 3GPP TS 36.211§ 3.1 (Exhibit F). $N_{RB1}^{DL}$ and $N_{RB2}^{DL}$ represent bandwidths of transmission points expressed in PRBs.

Figure 6:
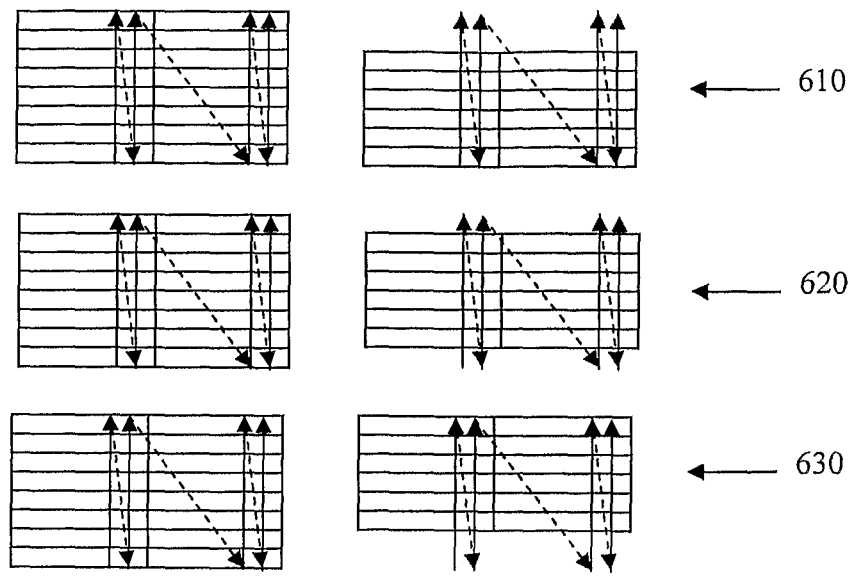
FIG. 6 illustrates exemplary URS sequences for different bandwidths (BWs) in accordance with this invention.

FIG. 6 illustrates exemplary URS sequences for different bandwidths (BWs) in accordance with this invention. Cells 610 are two lower frequency edge aligned cells where the offset has a value of 0. Cells 620 are two center frequency aligned cells where the offset has a value of half the difference between the BWs of the cells. Cells 630 are two upper frequency edge aligned cells where the offset has a value of the difference between the BWs of the cells.

Various exemplary embodiments in accordance with this invention may use a URS sequence mapping equation such as:

$$a_{k,l}^{(p)} = s \cdot r(3 \cdot l' \cdot N_{RB}^{max,DL} + 3 \cdot (n_{PRB} + n_{PRBoffset}) + m')$$

where $a_{k,l}^{(p)}$ is a value of resource element (k, l) for antenna port p, where s is sign (e.g., determined by the orthogonal code), where r(x) is the $x^{th}$ element in the scrambling sequence, where l' is a URS-bearing OFDM symbol index, where $N_{RB}^{max,DL}$ is the size of the largest downlink bandwidth, where $n_{PRB}$ is the physical resource block number, where $n_{PRBoffset}$ is the PRB number/index offset, and where m' is a URS frequency-domain resource element index within a PRB.

UEs may be informed of the frequency subband of cells in a measurement set such that the UE may measure and report channel state information (CSI) measurements. The information provided may include the width and location of the CSI subband to be measured. The CSI bandwidth may be equal to the full cell's BW.

In situations where the transmission points have different BW and are center aligned, the max number of PRBs, supporting JP MU-CoMP based on CDMed DRS, may be set as the number of the PRBs ($N_{RB}^{DL}$) of the cell with the lowest BW. Alternatively, in situations where the transmission points are not center aligned, the max number of PRBs, supporting JP MU-CoMP based on CDMed DRS, may be set as half of the PRBs of the cell with the lowest BW due to the DC subcarrier. Setting the max number of PRBs accordingly ensures that the system can provide JP CoMP.

Figure 7:
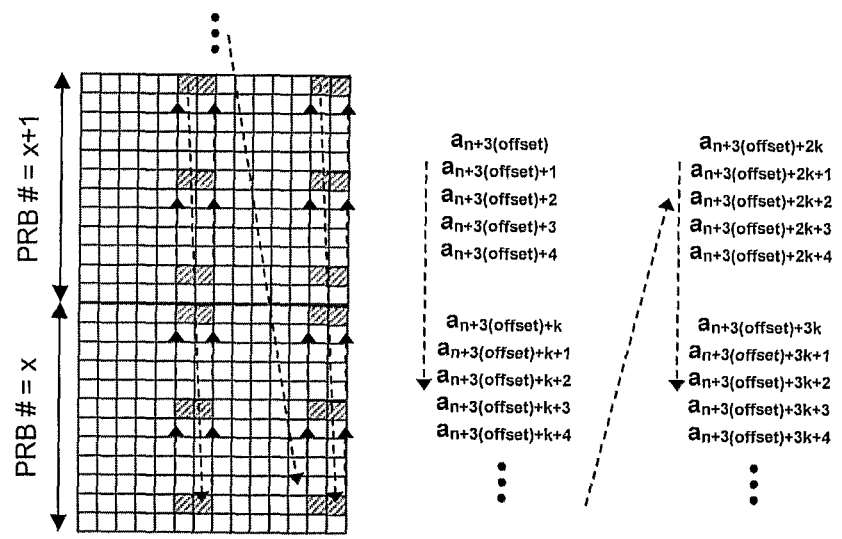
FIG. 7 illustrates an exemplary scrambling sequence mapping in accordance with this invention for two PRIN.
Figure 8:
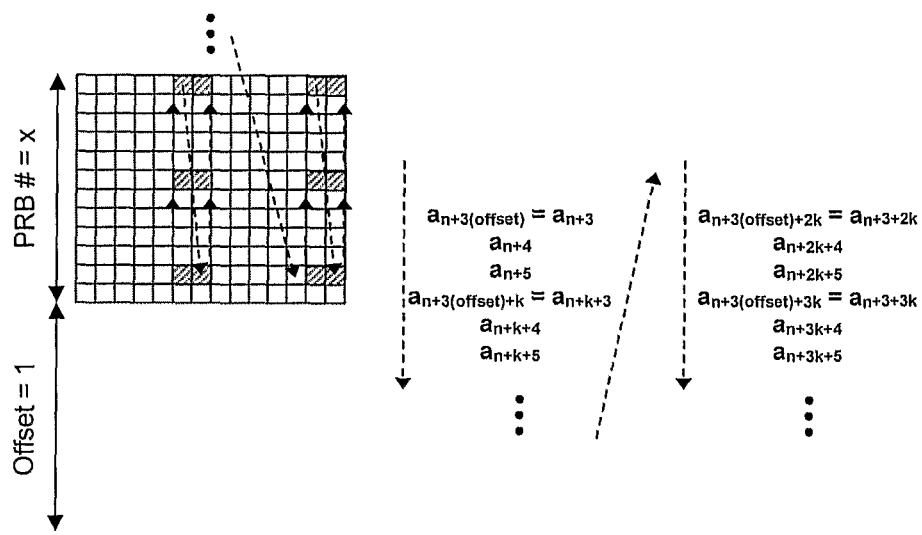
FIG. 8 illustrates an exemplary scrambling sequence mapping in accordance with this invention for one PRBs where the offset is 1 PRB.

FIGS. 7 and 8 illustrate an exemplary scrambling sequence mapping in accordance with this invention. FIG. 7 illustrates a scrambling sequence mapping for two PRBs. FIG. 8 illustrates a scrambling sequence mapping for one PRBs where the offset is 1 PRB.

Based on the foregoing it should be apparent that the exemplary embodiments of this invention provide a method, apparatus and computer program(s) for mapping of reference signals for multi-cell transmission. Using the described reference signals mapping, JP CoMP can be supported where the transmission points have different BWs or where the participating transmission points have different relative placements of the center frequencies.

Figure 9:
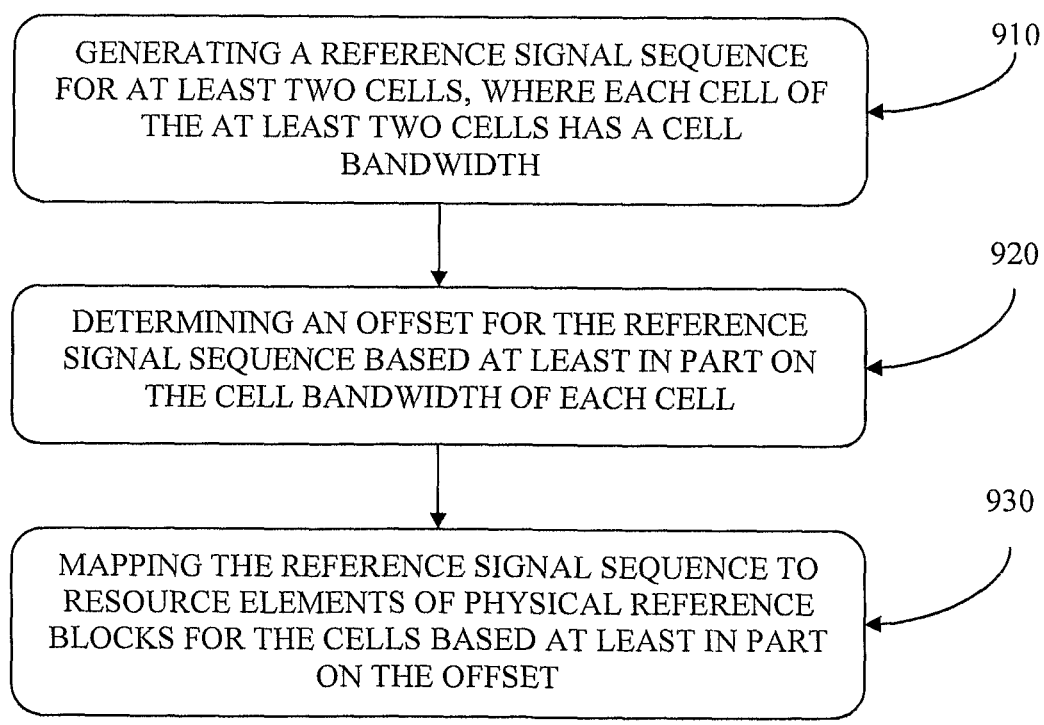
FIG. 9 is a logic flow diagram that illustrates the operation of an exemplary method, and a result of execution of computer program instructions embodied on a computer readable memory, in accordance with various exemplary embodiments of this invention.

FIG. 9 is a logic flow diagram that illustrates the operation of a method, and a result of execution of computer program instructions, in accordance with the exemplary embodiments of this invention. In accordance with these exemplary embodiments a method performs, at Block 910, a step of generating a reference signal sequence for at least two cells, where each cell of the at least two cells has a cell bandwidth. The method performs determining an offset for the reference signal sequence based at least in part on the cell bandwidth (and/or on the BW location) of each cell at Block 920. At Block 930, the method includes mapping the reference signal sequence to resource elements of physical resource blocks for the cells based at least in part on the offset.

The various blocks shown in FIG. 6 may be viewed as method steps, and/or as operations that result from operation of computer program code, and/or as a plurality of coupled logic circuit elements constructed to carry out the associated function(s).

An exemplary embodiment in accordance with this invention is a method for mapping of RSs. The method includes generating a RS sequence for two or more cells, where each cell of the two or more cells has a cell BW. The method also includes determining an offset for the RS sequence based at least in part on the cell BW (and/or on the BW location) of each cell. Mapping the RS sequence to REs of PRBs for the cells based at least in part on the offset is included in the method.

In a further exemplary embodiment of the method above, determining the offset includes assigning the offset a value representing one of: zero, one half the difference between the BWs of the cells, the difference between the BWs of the cells.

In an additional exemplary embodiment of any one of the methods above, determining the offset includes determining whether the two or more cells are one of: center aligned, lower frequency edge aligned and upper frequency edge aligned.

In a further exemplary embodiment of any one of the methods above, a cell BW of a first cell of the two or more cells is not equal to a cell BW of a second cell of the two or more cells.

In an additional exemplary embodiment of any one of the methods above, the method also includes sending instruction to one or more UEs to measure a CSI subband. The instructions may include width information and location information of the CSI subband. The method may also include, in response to sending the instructions, transmitting CSI measurement results.

In a further exemplary embodiment of any one of the methods above, the method also includes transmitting the offset.

In an additional exemplary embodiment of any one of the methods above, transmitting the offset includes using RRC channel signaling, DCI signaling and/or SI signaling.

In a further exemplary embodiment of any one of the methods above, the reference signal sequence is a JP CoMP RS sequence.

In an additional exemplary embodiment of any one of the methods above, the RS sequence is a DL UE specific RS sequence for CoMP.

In a further exemplary embodiment of any one of the methods above, the offset is a frequency offset.

An additional exemplary embodiment in accordance with this invention is a computer readable medium tangibly encoded with a computer program executable by a processor to perform actions for mapping of RSs. The actions include generating a RS sequence for two or more cells, where each cell of the two or more cells has a cell BW. The actions also include determining an offset for the RS sequence based at least in part on the cell BW (and/or on the BW location) of each cell. Mapping the RS sequence to REs of PRBs for the cells based at least in part on the offset is included in the actions.

In a further exemplary embodiment of the computer readable medium above, determining the offset includes assigning the offset a value representing one of: zero, one half the difference between the BWs of the cells, the difference between the BWs of the cells.

In an additional exemplary embodiment of any one of the computer readable media above, determining the offset includes determining whether the two or more cells are one of: center aligned, lower frequency edge aligned and upper frequency edge aligned.

In a further exemplary embodiment of any one of the computer readable media above, a cell BW of a first cell of the two or more cells is not equal to a cell BW of a second cell of the two or more cells.

In an additional exemplary embodiment of any one of the computer readable media above, the actions also include sending instruction to one or more UEs to measure a CSI subband. The instructions may include width information and location information of the CSI subband. The actions may also include, in response to sending the instructions, transmitting CSI measurement results.

In a further exemplary embodiment of any one of the computer readable media above, the actions also include transmitting the offset.

In an additional exemplary embodiment of any one of the computer readable media above, transmitting the offset includes using RRC channel signaling, DCI signaling and/or SI signaling.

In a further exemplary embodiment of any one of the computer readable media above, the reference signal sequence is a JP CoMP RS sequence.

In an additional exemplary embodiment of any one of the computer readable media above, the RS sequence is a DL UE specific RS sequence for CoMP.

In a further exemplary embodiment of any one of the computer readable media above, the offset is a frequency offset.

An additional exemplary embodiment in accordance with this invention is an apparatus for mapping of RSs. The apparatus includes at least one processor; and at least one memory including computer program code. The at least one memory and the computer program code are configured to, with the at least one processor, cause the apparatus to perform operations. The operations include to generate a RS sequence for two or more cells, where each cell of the two or more cells has a cell BW. The operations also include to determine an offset for the RS sequence based at least in part on the cell BW (and/or on the BW location) of each cell. To mapping the RS sequence to REs of PRBs for the cells based at least in part on the offset is included in the operations.

In a further exemplary embodiment of the apparatus above, when determining the offset the operations include to assign the offset a value representing one of: zero, one half the difference between the BWs of the cells, the difference between the BWs of the cells.

In an additional exemplary embodiment of any one of the apparatus above, when determining the offset the operations include to determine whether the two or more cells are one of: center aligned, lower frequency edge aligned and upper frequency edge aligned.

In a further exemplary embodiment of any one of the apparatus above, a cell BW of a first cell of the two or more cells is not equal to a cell BW of a second cell of the two or more cells.

In an additional exemplary embodiment of any one of the apparatus above, the operations also include to send instruction to one or more UEs to measure a CSI subband. The instructions may include width information and location information of the CSI subband. The operations may also include, in response to sending the instructions, to transmit CSI measurement results.

In a further exemplary embodiment of any one of the apparatus above, the operations also include to transmit the offset.

In an additional exemplary embodiment of any one of the apparatus above, when transmitting the offset the operations include to use RRC channel signaling, DCI signaling and/or SI signaling.

In a further exemplary embodiment of any one of the apparatus above, the reference signal sequence is a JP CoMP RS sequence.

In an additional exemplary embodiment of any one of the apparatus above, the RS sequence is a DL UE specific RS sequence for CoMP.

In a further exemplary embodiment of any one of the apparatus above, the offset is a frequency offset.

An additional exemplary embodiment in accordance with this invention is a apparatus for mapping of RSs. The apparatus includes means for generating (e.g., a processor) a RS sequence for two or more cells, where each cell of the two or more cells has a cell BW. The apparatus also includes means for determining (e.g., a processor) an offset for the RS sequence based at least in part on the cell BW (and/or on the BW location) of each cell. Means for mapping (e.g., a processor) the RS sequence to REs of PRBs for the cells based at least in part on the offset is included in the apparatus.

In a further exemplary embodiment of the apparatus above, the determining means include means for assigning (e.g., a processor) the offset a value representing one of: zero, one half the difference between the BWs of the cells, the difference between the BWs of the cells.

In an additional exemplary embodiment of any one of the apparatus above, the determining means include means for determining (e.g., a processor) whether the two or more cells are one of: center aligned, lower frequency edge aligned and upper frequency edge aligned.

In a further exemplary embodiment of any one of the apparatus above, a cell BW of a first cell of the two or more cells is not equal to a cell BW of a second cell of the two or more cells.

In an additional exemplary embodiment of any one of the apparatus above, the apparatus also includes means for sending (e.g., a transmitter) instruction to one or more UEs to measure a CSI subband. The instructions may include width information and location information of the CSI subband. The apparatus may also include means for transmitting (e.g., a transmitter) CSI measurement results in response to sending the instructions.

In a further exemplary embodiment of any one of the apparatus above, the apparatus also includes means for transmitting (e.g., a transmitter) the offset.

In an additional exemplary embodiment of any one of the apparatus above, the transmitting means include means for using (e.g., a transmitter) RRC channel signaling, DCI signaling and/or SI signaling.

In a further exemplary embodiment of any one of the apparatus above, the reference signal sequence is a JP CoMP RS sequence.

In an additional exemplary embodiment of any one of the apparatus above, the RS sequence is a DL UE specific RS sequence for CoMP.

In a further exemplary embodiment of any one of the apparatus above, the offset is a frequency offset.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as nonlimiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the E-UTRAN (UTRAN-LTE) system, it should be appreciated that the exemplary embodiments of this invention are not limited for use with only this one particular type of wireless communication system, and that they may be used to advantage in other wireless communication systems such as for example (WLAN, UTRAN, GSM as appropriate).

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters (e.g., PRB, RRC, UE, etc.) are not intended to be limiting in any respect, as these parameters may be identified by any suitable names. Further, the formulas and expressions that use these various parameters may differ from those expressly disclosed herein. Further, the various names assigned to different channels (e.g., RRC, etc.) are not intended to be limiting in any respect, as these various channels may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
generating a demodulation reference signal sequence for at least two cooperating cells, where each cell of the at least two cooperating cells has a respective cell bandwidth, where a cell bandwidth of a first cell of the at least two cooperating cells is not equal to a cell bandwidth of a second cell of the at least two cooperating cells;
calculating an offset in frequency for shifting the demodulation reference signal sequence, wherein the offset is calculated as a function of at least the cell bandwidth of each of the at least two cooperating cells and an alignment of the at least two cooperating cells; and
mapping the demodulation reference signal sequence to resource elements of physical resource blocks for the at least two cooperating cells based at least in part on the offset in frequency.

2. The method of claim 1, where calculating the offset comprises assigning the offset a value representing half a difference between the respective cell bandwidths of the at least two cooperating cells.

3. The method of claim 1, where calculating the offset comprises assigning the offset a value representing a difference between the respective cell bandwidths of the at least two cooperating cells.

4. The method of claim 1, further comprising: sending instruction to at least one user equipment to measure a channel state information sub band.

5. The method of claim 4, where the instructions comprise width information and location information of the channel state information sub band.

6. The method of claim 1, further comprising transmitting the offset.

7. The method of claim 6, where transmitting the offset comprises using at least one of: dedicated radio resource control signaling, downlink control information signaling and system information signaling.

8. The method of claim 6, wherein transmitting the offset comprises using dedicated radio resource control signaling.

9. The method of claim 6, wherein transmitting the offset comprises using system information signaling.

10. The method of claim 1, wherein the alignment of the at least two cooperating cells comprises one of:
center frequency alignment,
lower frequency edge alignment, or
upper frequency edge alignment.

11. An apparatus, comprising: at least one processor; and at least one non-transitory memory including computer program code, the at least one non-transitory memory and the computer program code configured to, with the at least one processor, cause the apparatus to perform at least the following:
to generate a demodulation reference signal sequence for at least two cooperating cells, where each cell of the at least two cooperating cells has a respective cell bandwidth, where a cell bandwidth of a first cell of the at least two cooperating cells is not equal to a cell bandwidth of a second cell of the at least two cooperating cells;
to calculate an offset in frequency for the demodulation reference signal sequence, wherein the offset is calculated as a function of at least the cell bandwidth of each cooperating cell and an alignment of the at least two cooperating cells; and
to map the demodulation reference signal sequence to resource elements of physical resource blocks for the at least two cooperating cells based at least in part on the offset in frequency.

12. The apparatus of claim 11, where the apparatus is configured, when calculating the offset, to assign the offset a value representing half a difference between the respective cell bandwidths of the at least two cooperating cells.

13. The apparatus of claim 11, where the apparatus is configured, when calculating the offset, to assign the offset a value representing a difference between the respective cell bandwidths of the at least two cooperating cells.

14. The apparatus of claim 11, where the at least one memory and the computer program code are further configured to, with the at least one processor, cause the apparatus: to send instruction to at least one user equipment to measure a channel state information sub band.

15. The apparatus of claim 14, where the instructions comprise width information and location information of the channel state information sub band.

16. The apparatus of claim 11, where the at least one memory and the computer program code are further configured to, with the at least one processor, cause the apparatus: to transmit the offset.

17. The apparatus of claim 16, where the apparatus is configured, when transmitting the offset, to use at least one of: dedicated radio resource control signaling, downlink control information signaling and system information signaling.

18. A non-transitory computer readable medium tangibly encoded with a computer program executable with a processor to perform actions comprising:
  generating a demodulation reference signal sequence for at least two cooperating cells, where each cell of the at least two cooperating cells has a respective cell bandwidth, where a cell bandwidth of a first cell of the at least two cells is not equal to a cell bandwidth of a second cell of the at least two cooperating cells;
  calculate an offset in frequency for shifting the demodulation reference signal sequence, wherein the offset is calculated as a function of at least the cell bandwidth of each cooperating cell and an alignment of the at least two cooperating cells; and
  mapping the demodulation reference signal sequence to resource elements of physical resource blocks for the at least two cooperating cells based at least in part on the offset in frequency.

19. The non-transitory computer readable medium of claim 18, where calculating the offset comprises assigning the offset a value representing half a difference between the respective bandwidths of the at least two cooperating cells.

20. The non-transitory computer readable medium of claim 18, where calculating the offset comprises assigning the offset a value representing a difference between the respective bandwidths of the at least two cooperating cells.

21. The non-transitory computer readable medium of claim 18, where the actions further comprise: sending instruction to at least one user equipment to measure a channel state information sub band.

22. The non-transitory computer readable medium of claim 21, where the instructions comprise width information and location information of the channel state information sub band.

23. The non-transitory computer readable medium of claim 18, where the actions further comprise transmitting the offset.

24. The non-transitory computer readable medium of claim 23, where transmitting the offset comprises using at least one of: dedicated radio resource control signaling, downlink control information signaling and system information signaling.

* * * * *